2,890,667

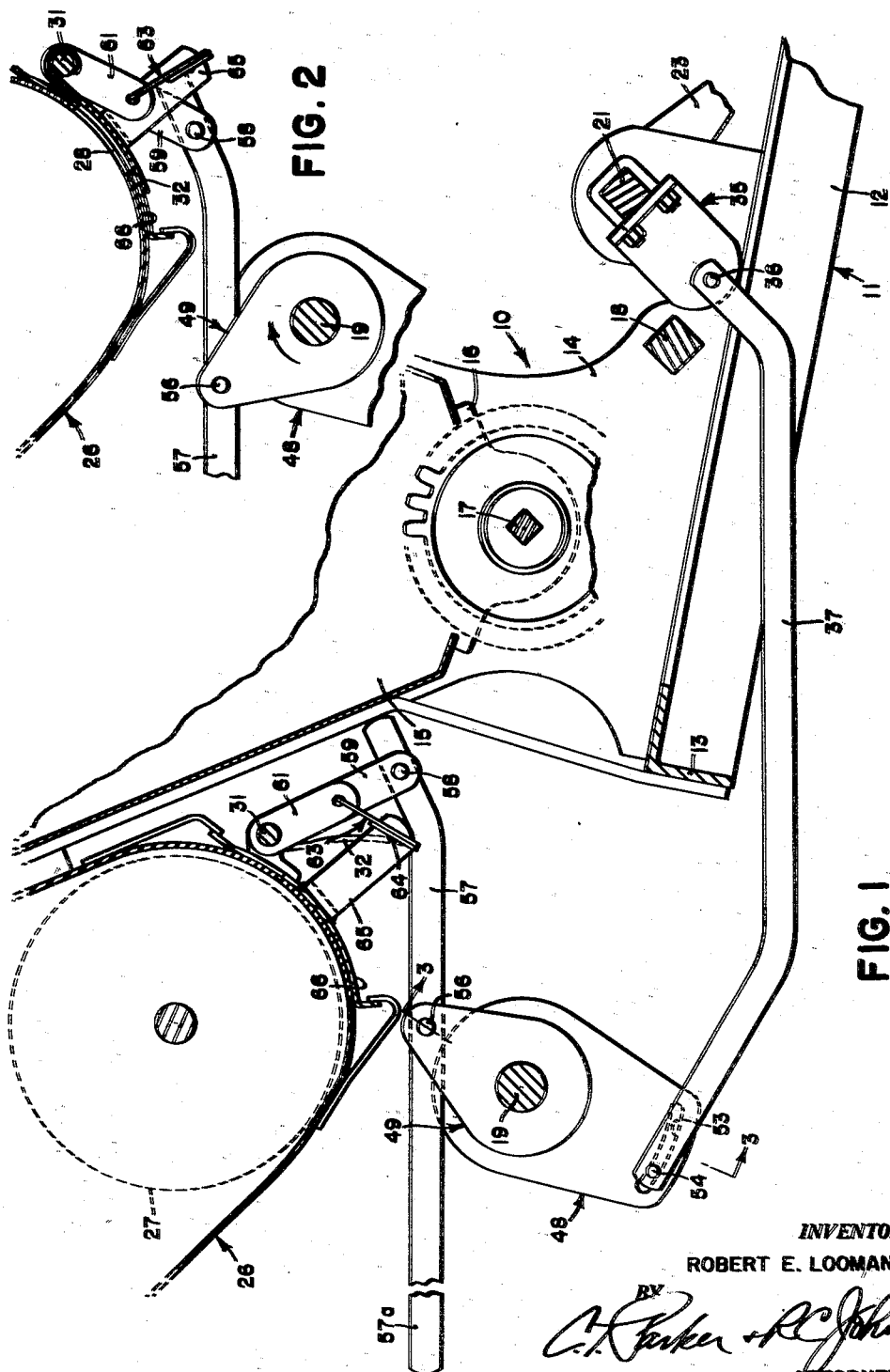
June 16, 1959    R. E. LOOMANS    2,890,667
FERTILIZER DISTRIBUTOR GATE OPERATING ARRANGEMENT
Filed Feb. 1, 1955    2 Sheets-Sheet 1
INVENTOR.
ROBERT E. LOOMANS
ATTORNEYS June 16, 1959  R. E. LOOMANS  2,890,667
FERTILIZER DISTRIBUTOR GATE OPERATING ARRANGEMENT
Filed Feb. 1, 1955  2 Sheets-Sheet 2
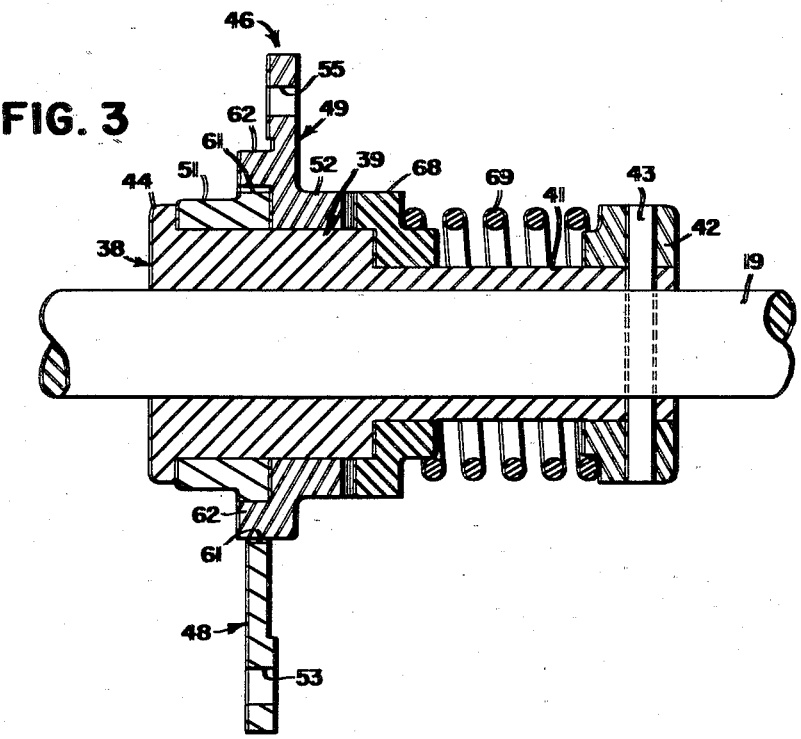
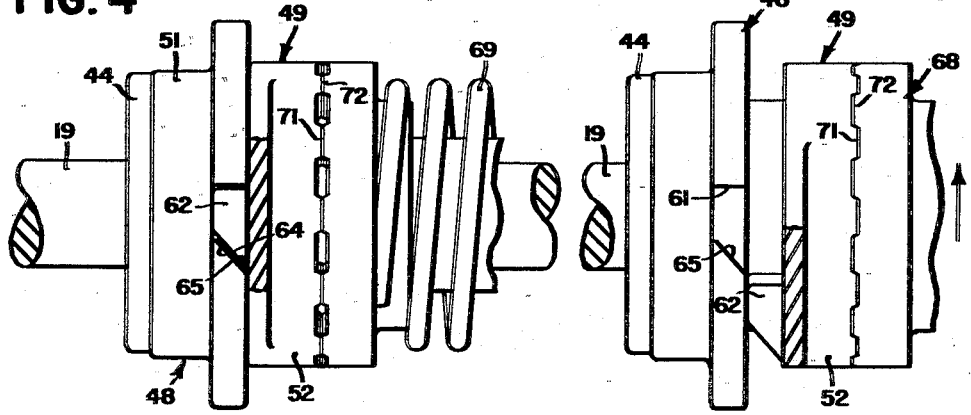
INVENTOR.
ROBERT E. LOOMANS
ATTORNEYS

Patented June 16, 1959

2,890,667

FERTILIZER DISTRIBUTOR GATE OPERATING ARRANGEMENT

Robert E. Loomans, Mayville, Wis., assignor, by mesne assignments, to Deere & Company, a corporation of Delaware Application February 1, 1955, Serial No. 485,551

8 Claims. (Cl. 111—67)

The present invention relates generally to agricultural implements and more particularly to material-dispensing implements, such as fertilizer distributors, for example, constructed and arranged to be drawin across a field for the purpose of distributing material onto the field.

The object and general nature of the present invention is the provision of means in the nature of flow-control gate mechanism adapted to be opened and closed according to whether the machine is placed into operation or brought out of operation, with associated mechanism whereby the gates may be closed manually to stop the flow of material whenever the machine is stopped in the field, and with means for automatically opening the gate mechanism when the machine is again started.

More specifically, the present invention contemplates the provision of a fertilizer attachment having fertilizer flow-control gate means so constructed and arranged to be opened and closed automatically with the raising and lowering of the grain drill furrow openers, the fertilizer attachment including means whereby the flow-control gate means may be closed manually, even though the furrow openers are left in their lowered position, the present invention also contemplating the provision of means whereby after the gates have been controlled manually, they are automatically opened when the machine travels forwardly.

These and other objects and advantages of the present invention will be apparent to those skilled in the art after a consideration of the following detailed description of the presently preferred embodiment, taken in conjunction with the accompanying drawings in which the preferred embodiment has been shown by way of illustration.

In the drawings:

Fig. 1 is an end view, with certain parts shown in section, of a grain drill with fertilizer attachment, incorporating the principles of the present invention.

Fig. 2 is a view, somewhat fragmentary in nature and similar to Fig. 1, showing the flow-control gates closed.

Fig. 3 is a sectional view taken generally along the line 3—3 of Fig. 1, showing the clutch mechanism in a position in which the gates may manually be closed when the grain drill furrow openers are lowered.

Fig. 4 is a view of the clutch parts showing the positions thereof when the flow-control gates are under the control of the furrow opener raising and lowering means.

Fig. 5 is a view similar to Fig. 4, showing the positions of the clutch parts after their manually controllable means has been operated to close the gates when the outfit is stationary with the furrow openers in their lowered position.

Referring first to Fig. 1, which shows the principles of the present invention as incorporated in a fertilizer type grain drill, the grain drill itself is indicated in its entirety by the reference numeral 10 and includes a generally downwardly and forwardly, transversely extending frame 11 that is made up of fore-and-aft extending angles 12 and one or more cross angles 13, with end members 14 carrying a seed hopper 15 along the bottom of which is disposed a number of seeding units 16 actuated by a common seeding shaft 17. So far as the grain drill construction is concerned, it is quite similar to that shown in U.S. Patent 2,561,235, issued July 17, 1951 to Schmutzler, to which reference may be made if necessary, and in its broader aspects the frame of the drill serves as a mobile support adapted to be propelled in the usual way by a farm tractor.

The grain drill 10 is equipped with a pair of supporting ground wheels that are connected to drive a jackshaft 18 journaled for rotation in the grain drill frame and connected in any suitable way to drive the seeding shaft 17 and also a fertilizer jackshaft 19 to which reference will be made later. In the interests of clarity, the driving means connecting the shafts 17, 18 and 19 have been omitted but it will be understood by those skilled in this art that the shafts, particularly the shaft 19, constitute means that moves whenever the implement is moved over the ground. Also mounted on the grain drill frame 11 is a pressure shaft 21 to which a plurality of pressure arms 23 are fixedly connected, as, for example, in the Schmutzler patent disclosure. The forward ends of the pressure arms 23 are connected by rods, links or the like with grain drill furrow openers that may be raised by rocking the shaft or shafts 21 in a direction to carry the pressure arms 23 upwardly from the positions shown in Fig. 1. The furrow openers and associated parts may be like that shown, for example, in U.S. Patent 2,520,345, issued August 29, 1950 to Starr, to which reference may also be made if necessary. The rockshaft 21 may be actuated by any suitable means, either by hand or power, as desired, but in present-day farm implements, power means is generally provided for rocking the shaft 21, which power means preferably is actuated by the power derived from the tractor to which the implement is connected.

In the fertilizer drill shown in Fig. 1, a fertilizer hopper 26 is carried rearwardly of the seed hopper 15 and the fertilizer hopper 26 includes dispensing and/or agitating means 27 driven in any suitable way from the fertilizer shaft 19. Preferably, through means such as that shown in the Schmutzler patent, when the furrow openers are raised by swinging the pressure arms 23 upwardly, the transmission of power to both the seeding shaft 17 and the fertilizer shaft 19 is interrupted.

Some fertilizing materials that are presently available are relatively free flowing under normal conditions, and it has been found that if a fertilizer grain drill using such material is stopped in the field, as for the purpose of replenishing seed in the seed hopper 15, some fertilizer flows from the hopper 26 through the dispensing openings 28 therein, even though the dispensing and agitating apparatus 27 is stationary. It has been proposed to eliminate this objectionable loss of fertilizer by providing shiftable gate means arranged to close the openings 28 in the fertilizer hopper 26 whenever the outfit is stopped in the field. One of the means proposed incorporates a rod in the form of a rockshaft 31 extending along the bottom of the fertilizer hopper 26 and carrying parts in the form of gates 32 that may be swung upwardly and rearwardly from the position shown in Fig. 1, for example, to the position shown in Fig. 2, the gates 32 closing against the openings 28 so as to prevent loss of fertilizer when the machine is stopped. The rod 31 and gates 32, with associated parts, constitute a controllable operating means, of which the gate 32 comprises a part that is adapted to be moved between open and closed positions. A simple way to operate the gates 32 automatically would be to connect them to the rockshaft 21 so that when the furrow openers are lowered for operation, the gates 32 would be automatically opened and when the rockshaft 21 is rocked to lift the furrow openers into a transport position the gates 32 will be closed. However, as mentioned above, it is sometimes necessary for the operator to stop the outfit when in the field in order, for example, to replenish seed in the seed hopper 15, and ordinarily the operator does not at this time raise the furrow openers. Thus, the gates 32, under the conditions assumed, would not be closed and fertilizer would flow through the openings 28 causing not only an unnecessary loss of fertilizer but also causing or tending to cause damage to the plants or seed in this area due to the excess quantities of fertilizer deposited on the ground.

According to the present invention, I provide means whereby the gates 32 may be closed manually whenever the outfit is stopped with the fertilizer furrow openers in their lowered position, with means for automatically opening the gates 32 when the machine is started up again, thus relieving the operator of the task of remembering to open the gates 32 as would be required if the latter were wholly manually controlled. The preferred arrangement in which the principles of the present invention have been incorporated will now be described.

An arm 35 is rigidly fixed to the rockshaft 21 and carries a pivot 36 by which the forward end of a generally fore-and-aft extending link member 37 is connected to the arm 35. Disposed on the shaft 19 is a supporting bushing 38 in the form of a hub section 39 that is generally cylindrical and has an axially extending portion 41 that is square or otherwise polygonal in cross section. The end of the latter section 41 is apertured to receive a pin 43 that fixes a collar 42 to the adjacent end of the member 38, the pin 43 also fixing the member 38 to the shaft 19 so as to rotate therewith. At the end opposite the portion 41, the member 38 carries a flange 44 that extends radially outwardly. Mounted on the cylindrical portion 39 of the member 38 is a lever means 46 that includes two parts or members, preferably in the form of arms 48 and 49 having, respectively, hub sections 51 and 52 that are rockably disposed on the cylindrical portion 49 of the member 38. The arm 48 extends generally downwardly, as best shown in Fig. 1, and at its lower end carries a slotted portion 53 in which a pivot pin 54 is disposed. The pivot 54 serves to connect the rear end of the link 37 with the arm 48.

The arm 49 is apertured, as at 55, to receive a pivot 56 that connects the arm 49 with a gate-operating link 57, the forward end of which is connected, as at 58, with an arm 59 that is fixed to the rod or shaft 31 on which the gates 32 are disposed. The link 57 extends rearwardly, as at 57a, Fig. 1, back of the fertilizer hopper 26 to provide a handle end by which the link 57 may be operated manually when desired. Secured to the rod or shaft 31 is a short arm 61 that is apertured at its outer end to receive one end of a hair pin spring 63, the other end of which is extended into an opening 64 formed in a bracket 65 that is attached to the slide member 66 on which the rod 31 and gates 32 are mounted. The bracket 65 and associated parts are so arranged that the arm 61 and spring 63 constitute overcenter means by which the spring 63 acts either to hold the gate open, as shown in Fig. 1, or closed, as shown in Fig. 2. Thus, to shift the gates 32 from one position to another, all that it is necessary to do is to shift the gates from either position to a point slightly past the dead-center position toward their oher positions.

Referring now to Figs. 3 to 5, and particularly to Fig. 3, the arm 48 is provided with a pair of lug-receiving openings or slots 61 in which lugs 62 on the arm 49 are adapted to enter. When the lugs 62 lie in the openings 61, the two arms 48 and 49 are caused to move together, but if the arm 49 is moved relative to the arm 48, the cam section or inclined section 64 on each of the lugs 62 acts against a cooperating angled or cam surface 65 formed in one wall of the opening 61 to cause the arm 49 to be shifted axially away from the arm 48, as will be seen from Fig. 5.

When the arm 49 is shifted away from the arm 48, the hub section 52 on the arm 49 comes up against a collar 68 that is disposed on the square portion 41 of the bushing 38, and therefore rotates with the shaft 19. A relatively heavy spring 69 is confined between the collar 42 and the collar 68, and when the lugs 62 are entirely disengaged from the associated openings 61, the collar 68 has been shifted axially a distance sufficient to compress the spring 69 an appreciable amount. Shallow serrations 71 and 72 are formed on the hub section 52 and the collar 68, respectively, and serve as clutch means for causing the shaft 19 to act through the collar 68 to rotate the arm 49 back to its position in which the lugs 62 reengage in the openings 61, providing, of course, that the shaft 19 is rotating. As will be seen from Fig. 3, when the lugs 62 on the arm 49 engage fully in the openings 61 of the arm 48, the serrations 71 and 72 are separated by a small distance so that, when the arms 48 and 49 are thus interconnected, there is no appreciable contact between the arm 49 and collar 68.

The operation of the device of the present invention is substantially as follows.

The grain drill or fertilizer attachment is shown in its operating position in Fig. 1, in which the rockshaft 21 has been rocked to lower the furrow openers into operating position and this causes the arm 35 to swing rearwardly. The rearward movement of the link member 37 acts through the interconnected arms 48 and 49 to shift the link 57 forwardly substantially into a position like that shown in Fig. 1, in which the hair pin spring 63 acts to hold the gates 32 in their open position. Fertilizer is therefore free to flow downwardly and outwardly through the dispensing openings 28. If at any time, the operator stops the outfit, as to fill up the seed box 15, in which case he may not raise the furrow openers, the operator will, to prevent loss of fertilizer, manually pull rearwardly on the link 57 so as to close the gates 32, moving them into the position shown in Fig. 2. When he thus moves the link 57 rearwardly, carrying the pivot 58 past its dead-center position, the spring 63 insures that the rearward movement of the link 57 will be completed and the gates 32 swung into their closed position. Such rearward movement of the link 57 results in a rearward swinging of the arm 49 relative to the arm 48, thus disconnecting the arm 49 from the arm 48 by shifting the arm 49 to the position indicated in Fig. 5, in which the lugs 62 are carried out of and slightly away from the opening 61. Thus, so long as the outfit is stationary, the gates 32 are held closed. Immediately upon the operator starting up the outfit, the fertilizer shaft 19 will be rotated in the direction of the arrows in Figs. 2 and 5, and since the axial displacement of the member 49 brings the serrations 71 and 72 into interconnection and the spring 69 under substantial pressure, as soon as the shaft 19 starts to rotate in the direction of the arrow (Fig. 2) the arm 49 will be moved forwardly, and thus automatically cause the link 57 to move the gates 32 into their open position, which occurs about the time the lugs 62 re-seat in the opening 61. Thus, the serrations 71 and 72, with associated parts, constitute clutch means that connects the shaft 19 with the gates 32 to move them from a closed position to an open position. At about the time the lugs 62 reseat in the openings 61 the serrations 71 and 72 are disconnected so that further and continued rotation of the fertilizer shaft 19 does not cause undue wear on the clutch parts, that is, the arm 49, particularly the hub section 52, and the collar. Therefore, according to the present invention, it is not necessary for the operator to remember to open the gates 32 after having once closed them to prevent the loss of fertilizer for, according to the present invention, the fertilizer flow-control gate means will automatically be opened just as soon as the outfit is started up. Normally, the arms 48 and 39 are maintained in interconnected relation and the gates are automatically opened and closed with the lowering and raising, respectively, of the pressure arms 23 and the furrow openers that are connected therewith.

In conventional grain drill structure, the pressure arms 23 in their lowered position, as shown in Fig. 1, may be shifted in one direction or the other to vary the depth of operation, and to take care of this movement of the arms 23 and shaft 21, the lower end of the arm 48 is provided with the slot 53 mentioned above. This slot accommodates movement of the pressure arms and associated parts in their lowered position to secure changes in the depth of operation of the grain drill furrow openers.

While I have shown and described above the preferred structure in which the principles of the present invention are incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a fertilizer distributor comprising a hopper having discharge opening means, a mobile support carrying said hopper and adapted to be propelled over the ground, a rotatable shaft carried by said support and driven when said support is propelled over the ground, dispensing mechanism carried by the support and including a flow-controlling gate carried by said support and movable relative to said hopper opening means between open and closed positions, means connected with said gate for opening and closing the latter, and means connected with the shaft for automatically opening said gate when said shaft is rotated with the gate in its closed position, said gate-opening and -closing means including a part rockably mounted on said shaft, and means including a spring-biased clutch and a part rotatable with said shaft for shifting said gate to its open position in response to rotation of said shaft.

2. In an agricultural implement, a mobile support, fertilizer hopper carried by said mobile support and having openings through which material may be dispensed, a rotatable shaft driven when the implement is moved over the ground, said shaft being carried by said mobile support, movable gate means carried by said hopper and movable relative thereto between open and closed positions, material-dispensing means in said hopper, furrow opener raising and lowering means carried by said mobile support and movable between raised and lowered positions, means connected with said furrow-opener raising and lowering means and with said gate means for opening and closing the latter when said furrow opener raising and lowering means is operated between lowered and raised positions, respectively, said connecting means including a pair of normally connected clutch parts mounted on said shaft, means connecting one of said parts with said furrow opener raising and lowering means, and means connecting the other part with said gate, means connected with said other part for shifting the latter relative to said one part for closing the gate independently of the position of said furrow opener raising and lowering means, and means connected with said shaft and responsive to rotation thereof for automatically shifting said other part into its gate-opening position in response to rotation of said shaft when said furrow opener raising and lowering means is in its lowered position.

3. The invention set forth in claim 2, further characterized by a port fixed to rotate with said shaft, means on said parts for shifting said other part axially of said shaft when said other part is moved relative to said one part when said gate is closed with the furrow opener raising and lowering means in its lowered position, said axial movement of said other part moving the latter against the part that is fixed to rotate with said shaft.

4. In an agricultural implement, a support, a part to be controlled movably mounted on said support and movable from one position to another, a rotatable shaft carried by said support, means for operating said movable part including a pair of disconnectible members rockably mounted on said shaft, one being shiftable axially of the shaft into and out of connection with the other member, relatively movable cam means carried by said members and adapted in one position to cause said members to move together about said shaft, means connected with one of said members for shifting both of them together when said cam means is in said one position, means connected with the other of said members for transmitting said shifting movement to said movable part, means connected with said other member for moving the latter relative to said one member and shifting said part from one position to another, means movable with said shaft, and resiliently biased clutch means on said last mentioned movable means and said other member and adapted when engaged to shift said other member relative to said one member, in response to rotation of said shaft, from said other position back to said one position.

5. In an agricultural implement, a rotatable shaft, a pair of parts mounted on said shafts for rocking movement relative thereto, means adapted to interlock said parts to cause them to move together relative to said shaft, said interlocking means including cam means acting, when one part is shifted relative to the other, to cause one of said parts to be shifted axially relative to said shaft, means carried by said shaft for rotation therewith adjacent said shiftable part, interengageable clutch means on said shaft-carried means and said shiftable part, whereby, when said one part is moved relative to the other, the axially shiftable part is moved into operative connection with said shaft-carried means, whereby rotation of the shaft acts to carry said axially shiftable part back into interlocked relation with the other part, and spring means connected with said clutch means and acting to urge said pair of parts into their interlocked position.

6. In an agricultural implement, a rotatable shaft, a pair of parts mounted for rocking movement on said shaft, means interconnecting said parts comprising cam lug and slot means arranged whereby, when one of said parts is moved relative to the other, one of said parts is shifted axially relative to the shaft out of engagement with the other part, means connected with one of said parts to move the other part when said parts are interconnected, means connected with the other part to be moved thereby, said last mentioned means being movable independently of the means connected with said one part and adapted when so moved to shift said other part relative to said one part, thereby acting through said cam lug and slot means to shift said last mentioned other part axially, means carried by said rotatable shaft and brought into operative engagement with said axially shiftable part, when said parts are disconnected, and means to drive said shaft in a direction whereby rotation of said shaft acts to restore said parts to their interconnected relation.

7. In an agricultural implement, a rotatable shaft, a pair of arms rockably mounted on said shaft, cam means on said arms and normally acting to hold the latter in interconnected relation and to cause said arms to move in the same direction about the axis of said shaft, whereby movement of one arm in one direction acts to shift the other arm in the same direction about said shaft, said cam means being angled so that, when one arm is rotated about the axis of the shaft relative to the other arm, one of said arms is shifted axially of said shaft, and means carried by the latter and acting against the axially shiftable arm for restoring said arms to their interconnected relation.

8. In an agricultural implement, a rotatable shaft, a pair of arms disposed on said shaft for rocking movement relative thereto and arranged in side-by-side relation, one of said arms having an opening extending laterally therethrough and the other arm having a projection extending into said opening, said opening and projection having cooperating cam surfaces whereby one arm may be moved relative to the other about the axis of said shaft and said cam surfaces will cause said arms to separate in a generally axial direction, a spring-biased part carried for rotation with said shaft and disposed adjacent the axially movable arm, said part being located so that when said arms are separated said axially movable arm engages said part, and means on said axially shiftable arm and said part for causing rotation of the shaft and part in one direction to rock said axially shiftable arm back to its original position with said projection engaging in the opening in the associated arm.

References Cited in the file of this patent

UNITED STATES PATENTS

| | | |
|---|---|---|
| 1,793,221 | Iversen | Feb. 17, 1931 |
| 1,864,122 | Cole | June 21, 1932 |
| 1,874,634 | Schaupp | Aug. 30, 1932 |
| 2,029,127 | Schaeffer | Jan. 28, 1936 |
| 2,210,994 | White | Aug. 13, 1940 |
| 2,332,743 | Morris | Oct. 26, 1943 |
| 2,657,780 | Starr | Nov. 3, 1953 |
| 2,669,951 | Erwin | Feb. 23, 1954 |
| 2,670,699 | Kriegbaum | Mar. 2, 1954 |
| 2,676,555 | Schnell | Apr. 27, 1954 |
| 2,685,384 | Tanke | Aug. 3, 1954 |

UNITED STATES PATENT OFFICE

CERTIFICATE OF CORRECTION

Patent No. 2,890,667 June 16, 1959

Robert E. Loomans

It is hereby certified that error appears in the printed specification of the above numbered patent requiring correction and that the said Letters Patent should read as corrected below.

Column 3, line 65, for "oher" read — other —; column 5, line 41, after "support," insert — a —; line 69, for "port" read — part —.

Signed and sealed this 20th day of October 1959.

(SEAL)
Attest:

KARL H. AXLINE
Attesting Officer

ROBERT C. WATSON
Commissioner of Patents